United States Patent [19]

Sanborn

[11] Patent Number: 5,332,599
[45] Date of Patent: Jul. 26, 1994

[54] AQUEOUS CORRECTION FLUID

[75] Inventor: Norman G. Sanborn, South Weymouth, Mass.

[73] Assignee: The Gillette Company, South Boston, Mass.

[21] Appl. No.: 93,818

[22] Filed: Jul. 19, 1993

[51] Int. Cl.$^5$ .................. C09D 10/00; B32B 35/00
[52] U.S. Cl. ........................... 427/259; 427/260; 427/261; 427/265; 427/391; 427/411; 427/417; 427/140; 106/19 A; 106/20 A; 106/26 R; 523/161
[58] Field of Search ............... 106/19 A, 20 A, 26 R; 427/391, 411, 417, 259, 260, 261, 265, 140; 523/161

[56] References Cited

U.S. PATENT DOCUMENTS

| | | | |
|---|---|---|---|
| 2,683,699 | 7/1954 | Gehring | 524/213 |
| 2,773,849 | 12/1956 | Willis | 524/327 |
| 2,802,799 | 8/1957 | Johnson | 524/253 |
| 2,822,341 | 2/1958 | Miller et al. | 524/317 |
| 3,276,870 | 10/1966 | Bitting et al. | 106/19 R |
| 3,674,729 | 7/1972 | Mirick | 524/556 |
| 3,997,498 | 12/1976 | Reese et al. | 427/140 |
| 4,165,988 | 8/1979 | Page et al. | 106/190 |
| 4,289,666 | 9/1981 | Creekmore et al. | 428/914 |
| 4,654,081 | 3/1987 | Dalzell | 523/161 |
| 4,732,614 | 3/1988 | Brooks et al. | 427/140 |
| 4,853,117 | 5/1989 | Brooks et al. | 503/201 |
| 4,880,465 | 11/1989 | Loria et al. | 523/218 |
| 5,131,776 | 7/1992 | Mott | 401/198 |
| 5,199,976 | 4/1993 | Yau et al. | 106/19 A |

FOREIGN PATENT DOCUMENTS

| | | | |
|---|---|---|---|
| 0743819 | 6/1970 | Belgium | 106/19 A |
| 604624 | 9/1960 | Canada . | |
| 304887 | 5/1992 | European Pat. Off. . | |
| 2450720 | 4/1976 | Fed. Rep. of Germany | 106/20 A |
| 2823381 | 5/1979 | Fed. Rep. of Germany | 106/19 A |
| 254587 | 3/1988 | Fed. Rep. of Germany | 523/161 |
| 3919588 | 12/1989 | Fed. Rep. of Germany | 523/161 |
| 58-2363 | 1/1983 | Japan . | |
| 58-162674 | 9/1983 | Japan | 523/161 |
| 58-180568 | 10/1983 | Japan | 523/161 |
| 59-024764 | 2/1984 | Japan | 523/161 |
| 59-024765 | 2/1984 | Japan | 523/161 |
| 59-193973 | 11/1984 | Japan | 523/161 |
| 60-008376 | 1/1985 | Japan . | |
| 61-174274 | 8/1986 | Japan | 523/161 |
| 61-275369 | 12/1986 | Japan | 106/19 A |
| 62-001763 | 1/1987 | Japan | 523/161 |
| 62-195067 | 8/1987 | Japan | 523/161 |
| 63-142075 | 6/1988 | Japan . | |
| 63-142076 | 6/1988 | Japan | 523/161 |
| 63-175082 | 7/1988 | Japan | 523/161 |
| 63-223075 | 9/1988 | Japan | 106/19 A |
| 1-170671 | 7/1989 | Japan . | |
| 1-261473 | 10/1989 | Japan | 523/161 |
| 1-292074 | 11/1989 | Japan | 523/161 |
| 97572 | 4/1990 | Japan . | |
| 2-099570 | 4/1990 | Japan | 523/161 |
| 2-105876 | 4/1990 | Japan | 523/161 |
| 2-169678 | 6/1990 | Japan | 523/161 |
| 2-185577 | 7/1990 | Japan | 523/161 |
| 2-202561 | 8/1990 | Japan | 523/161 |
| 2-209973 | 8/1990 | Japan | 523/161 |
| 891730 | 12/1981 | U.S.S.R. | 523/161 |
| 92/07914 | 5/1992 | World Int. Prop. O. | 106/20 A |

*Primary Examiner*—Anthony Green
*Attorney, Agent, or Firm*—Fish & Richardson

[57] ABSTRACT

An aqueous correction fluid is provided which includes a latex binder, an opacifying pigment, a protective colloid, a nonionic surfactant, an anionic dispersant, and water. Preferably, the polymer binder is provided in the form of an aqueous emulsion. The correction fluid has improved freeze-thaw stability.

19 Claims, No Drawings

AQUEOUS CORRECTION FLUID

BACKGROUND OF THE INVENTION

The invention relates to aqueous correction fluids.

Correction fluids are used for correcting typed, handwritten or photocopied markings on paper. Generally, correction fluids are applied to paper surfaces in liquid form and then allowed to dry to form a film which effectively covers erroneous markings on the surface and which can receive a corrected marking.

Aqueous correction fluids typically include a pigment, e.g., titanium dioxide, a latex binder, which is usually a copolymer emulsion. Ethylene vinyl acetate (EVA) is the preferred latex binder/copolymer emulsion, since it minimizes bleed of underlying markings to which the fluid is applied and imparts other advantageous properties to the fluid.

Traditionally, correction fluids have also contained volatile organic solvents as freeze-thaw stabilizers. These fluids generally exhibit good freeze-thaw stability, i.e., the fluids are better able to resist coagulation after a number of freeze-thaw cycles. Coagulation is the irreversible agglomeration of particles originally dispersed in the latex. Volatile organic compounds (VOC), e.g., alcohols prevent coagulation of correction fluids by depressing the freezing point of water.

For environmental and safety reasons, it would be beneficial to eliminate all VOC's from correction fluids. However, with some fluids, reduction or elimination of VOC's can lead to freeze-thaw instability, particularly for those fluids containing inherently freeze-thaw unstable emulsions, most notably EVA emulsions. Without additional stabilization, aqueous correction fluids containing EVA emulsions typically coagulate. Therefore, these types of fluids are generally considered impractical for commercial use, as freeze-thaw conditions are frequently encountered in shipping and storage of correction fluids.

One solution to this problem is to use latex binders/polymer emulsions which are freeze-thaw stable. Unfortunately, most commercially available polymer emulsions which have good freeze-thaw stability tend to produce more bleed, when used in correction fluids, because of the amounts and types of surfactants/colloids used to stabilize them.

SUMMARY OF THE INVENTION

The invention features, in one aspect, a correction fluid having improved freeze-thaw stability. The correction fluid includes a latex binder, an opacifying pigment, a protective colloid, a nonionic surfactant, an anionic dispersant, and water.

In preferred embodiments, the latex binder is a polymer emulsion, more preferably a copolymer emulsion, most preferably an ethylene vinyl acetate copolymer emulsion; the protective colloid is a hydroxypropyl cellulose; the nonionic surfactant is a tetrafunctional block copolymer derived from sequential addition of propylene oxide and ethylene oxide to ethylene diamine; and the anionic dispersant is a sodium salt of a carboxylate polyelectrolyte. Preferably, the opacifying pigment is futile titanium dioxide.

The protective colloid, anionic dispersant, and nonionic surfactant are preferably present in the compositions in relative amounts sufficient to enable the correction fluid to withstand at least 3 freeze-thaw cycles. The term "freeze-thaw cycle" as used herein, refers to a controlled test in which the fluid is held for 17 hrs at $-10°$ C. and then allowed to thaw for 6 hrs at $25°$ C.

The invention features, in another aspect, a process for covering a marking on a paper substrate. The process includes contacting an applicator with a correction fluid that includes a latex binder, an opacifying pigment, a protective colloid, a nonionic surfactant, an anionic dispersant, and water. The applicator may be any suitable applicator for use with fluid compositions, e.g., a brush. The correction fluid on the applicator is then applied to cover a marking on a paper surface and allowed to dry. A corrective marking may subsequently be applied to the dried correction fluid, if desired.

The term "protective colloid", as it is used herein, refers to a surface active substance which prevents coagulation by forming a thin layer on the surface of each dispersed particle.

The term "anionic dispersant", as it is used herein, refers to an anionic substance which promotes the formation and stabilization of a dispersion of one substance in another.

The correction fluids of the invention exhibit improved freeze-thaw resistance. Further, preferred fluids of the invention are virtually free of volatile organic solvents, and thus are safer to manufacture, store and use than solvent-based correction fluids. The correction fluids of the invention also exhibit good bleed resistance when applied over an underlying mark.

Other features and advantages of the invention will be apparent from the Description of the Preferred Embodiments thereof, and from the claims.

DESCRIPTION OF THE PREFERRED EMBODIMENT

The preferred embodiments include a latex binder (a polymer emulsion), an opacifying pigment, a protective colloid, a nonionic surfactant, and an anionic dispersant.

The improved freeze-thaw stability of the preferred compositions is imparted by the combination of protective colloid, nonionic surfactant, and anionic dispersant.

It is believed that suitable protective colloids are materials which prevent coagulation/agglomeration by adsorbing onto the surfaces of dispersed particles, thereby minimizing the tendency of the dispersed particles to stick together. Preferred protective colloids include cellulosic materials such as hydroxypropyl cellulose, e.g., KLUCEL E cellulose, commercially available from Aqualon Co., and hydroxyethyl cellulose, most preferably hydroxypropyl cellulose. Other protective colloids, e.g., polyvinyl alcohol, may also be suitable. It is preferred that the protective colloid be present in an amount of from about 0.580 to 0.622 percent, most preferably about 0.601 percent.

Preferred anionic dispersants include sodium salts of carboxylate polyelectrolytes, more preferably sodium salts of maleic anhydride copolymers, e.g., TAMOL 731 SD dispersant, commercially available from Rohm and Haas, and sodium salts of polymethylmethacrylic acid. It is preferred that the anionic dispersant be present in an amount of/from about 0.293 to 0.313 percent, most preferably in an amount of 0.303 percent.

Preferred nonionic surfactants include polyoxyethylene (POE) sorbitan fatty acid esters, e.g., POE(20)sorbitan monooleate, available under the tradename TWEEN 80, from ICI Americas, Inc., and POE(40)sorbitol lanolin derivative, available under the tradename G 1441 from ICI Americas, Inc., and, most preferably, a tetrafunctional block copolymer derived from the sequential addition of propylene oxide and ethylene oxide to ethylene diamine, available under the tradename TETRONIC 904, from BASF. Preferred nonionic surfactants are those which, alone or combined with other nonionic surfactants, have a hydrophilic/lipophilic balance (HLB) value of from about 14 to 15, more preferably about 14.5. When the preferred POE sorbitan and sorbitol esters are used, it is preferred that the two surfactants be blended, more preferably in a 1:1 weight ratio, to obtain the desired HLB value of 14.5. However, other surfactants, including oil-in-water emulsifiers and/or detergents, can be used alone, if they have the desired HLB value, or blended to obtain the desired HLB value. The total amount of nonionic surfactants in the preferred composition is from about 0.264 to 0.284 weight percent, most preferably about 0.274 weight percent. The amount of nonionic surfactant in the most preferred composition is from about 0.236 to 0.254 weight percent, most preferably about 0.245 weight percent.

Suitable aqueous emulsions are those which contain a film-forming latex binder that is suitable for use in correction fluids, i.e., any polymeric or resinous material which binds pigments to paper and forms a continuous film which is preferably water resistant. It is further desirable that the film formed be receptive to retyped or rewritten marks without cracking and flaking off the paper. Because the preferred compositions have been developed to address the problem of freeze-thaw instability, the binder polymer used will typically be one which has a tendency to be freeze-thaw unstable, although other polymers that more generally exhibit good freeze thaw stability can be used. EVA emulsions are most notably freeze-thaw unstable, and are preferred for use in correction fluids because they impart good bleed resistance and produce flexible films. Preferred emulsions have a solids level of from about 54.5 to 56 percent, and are typically stabilized with polyvinyl alcohol or cellulose. The preferred EVA emulsion copolymer is commercially available from Reichhold Chemicals, Inc., Dover, Del., under the tradename ELVACE 40705-00. Preferred correction fluid compositions contain from about 14.51 to 15.56 weight percent of the latex binder/copolymer emulsion. While most preferred compositions contain about 15.035 weight percent of latex binder. Higher levels of the latex, relative to the other components, may cause coagulation under freeze-thaw conditions, while lower levels may cause the correction fluid to have poor film properties.

Any suitable opacifying agent having adequate hiding power to cover a desired type of marking, e.g., typed or handwritten, or copied on a paper surface, may be utilized in the compositions of the invention. Rutile titanium dioxide is most preferred, as it provides for maximum hiding and is a white pigment which can be toned to match a variety of bright paper stock colors. In the preferred embodiments, a blend of two rutile grades of titanium dioxide, available under the tradenames R-931 and R-902 from E.I. Dupont de Nemours & Co., Wilmington, Del., is most desirable. Preferably, R-931 grade $TiO_2$ and R-902 grade $TiO_2$ are used in a ratio of from about 1:2.5 to 1:2.9, most preferably about 1:2.7. It is preferred that the composition contain from about 45.10 to 48.44 weight percent pigment, most preferably about 46.77 weight percent.

The total amount of water present in the finished fluid is dependent on viscosity. Adjustments are made by first measuring the viscosity of the composition; then adding incremental amounts of water until the desired viscosity is obtained. It is preferred that sufficient water, or a blend of water and other solvent(s), be added to provide a viscosity from about 450 to 550. Normally, a water level of from about 36.65 to 36.77 weight percent, based on the total weight of the composition (excluding water present in the latex), will be suitable.

The preferred amounts and proportions given above for the nonionic surfactant, anionic dispersant and protective colloid are preferred when the preferred latex binder and opacifying pigments are used, in the preferred amounts. If different binder amounts or pigment types are used, the amounts and proportions of these three components may require adjustment to prevent coagulation under freeze-thaw conditions.

The compositions of the invention can include other conventional ingredients. For example, the compositions may contain colorants, defoamers, thickeners, buffers, and/or sequestrants.

The following example illustrates the invention.

EXAMPLE

A series of correction fluid compositions were formed by mixing the ingredients shown in Table 1.

TABLE 1

| Components | | Samples | |
|---|---|---|---|
| | | 1 | 2 |
| 1. water | | 36.191 | 36.253 |
| 2. defoamer | (NOPCO 8034) | .102 | .102 |
| 3. protective colloid | (KLUCEL E) | .601 | .601 |
| 4. buffer, sequestrant | (Sodium Citrate) | .137 | .137 |
| 5. nonionic surfactant | (TETRONIC 904) | .245 | — |
| 6. nonionic surfactant | (TWEEN 80) | — | .137 |
| 7. nonionic surfactant | (G-1441) | — | .137 |
| 8. anionic dispersant | (TAMOL 731 SD) | .303 | .303 |
| 9. thickener | (CABOSIL M5) | .572 | .481 |
| 10. titanium dioxide | (TIPURE R902) | 34.075 | 34.075 |
| 11. titanium dioxide | (TIPURE R931) | 12.687 | 12.687 |
| 12. aqueous colorant | (lamp black) | .031 | .031 |
| 13. aqueous colorant | (thalo blue) | .004 | .004 |
| 14. aqueous colorant | (carbazole violet) | .015 | .015 |
| 15. polymer emulsion | (ELVACE 40705) | 15.035 | 15.035 |

First, the defoamer was added to the water. Then, the protective colloid was added and allowed to dissolve. Then, the buffer was added and allowed to dissolve. Then, the non-ionic surfactant(s) and anionic surfactants were added, followed by the thickeners and the $TiO_2$, and other colorants mixing after each addition. The composition was then mixed at high speeds with a dispersator for about 30 minutes. Finally, the latex emulsion was added and mixed in.

Both of the correction fluids were tested under freeze-thaw conditions, of −10° C. for 17 hrs. and 25° C. for 6 hrs., and it was found that both compositions were able to withstand 3 cycles without coagulation or flocculation.

The preferred correction fluids can be used in conventional bottle and brush applicators, as well as other known correction fluid applicators.

Other embodiments are within the claims.

I claim:

1. An aqueous correction fluid comprising a latex binder, an opacifying pigment, a protective colloid, a nonionic surfactant, an anionic dispersant, and water.

2. The correction fluid of claim 1 wherein the latex binder comprises an aqueous emulsion copolymer.

3. The correction fluid of claim 2 wherein the aqueous emulsion copolymer is ethylene vinyl acetate.

4. The correction fluid of claim 1 wherein the protective colloid is a cellulosic material.

5. The correction fluid of claim 4 wherein the protective colloid is hydroxypropyl or hydroxyethyl cellulose.

6. The correction fluid of claim 1 wherein the nonionic surfactant is a tetrafunctional block copolymer derived from sequential addition of propylene oxide and ethylene oxide to ethylene diamine.

7. The correction fluid of claim 1 wherein the anionic dispersant is a sodium salt of a carboxylate polyelectrolyte.

8. The correction fluid of claim 1 wherein the pigment is rutile titanium dioxide.

9. The correction fluid of claim 1 wherein said protective colloid, said nonionic surfactant and said anionic dispersant are present in sufficient amounts to enable the fluid to undergo at least 3 freeze-thaw cycles without coagulation.

10. A method of covering a marking on a paper comprising the steps of
contacting an applicator with a correction fluid comprising a latex binder, an opacifying pigment, a protective colloid, a nonionic surfactant, an anionic dispersant, and water,
applying the fluid from the applicator to a marking on a paper surface, and
allowing the correction fluid to dry.

11. The method of claim 10 further comprising the step of applying a corrective marking to the dried correction fluid.

12. The method of claim 10 wherein the latex binder comprises an aqueous emulsion copolymer.

13. The method of claim 12 wherein the aqueous emulsion copolymer is ethylene-vinyl acetate.

14. The method of claim 10 wherein the protective colloid is a cellulosic material.

15. The method of claim 14 wherein the protective colloid is hydroxypropyl cellulose.

16. The method of claim 10 wherein the nonionic surfactant a tetrafunctional block copolymer derived from sequential addition of propylene oxide and ethylene oxide to ethylene diamine.

17. The method of claim 10 wherein the anionic dispersant is a sodium salt of a carboxylate polyelectrolyte.

18. The method of claim 10 wherein the pigment is titanium dioxide.

19. The method of claim 10 wherein said protective colloid, said nonionic surfactant and said anionic dispersant are present in sufficient amounts to enable the fluid to undergo at least 3 freeze-thaw cycles without coagulation.

* * * * *

UNITED STATES PATENT AND TRADEMARK OFFICE
CERTIFICATE OF CORRECTION

PATENT NO. : 5,332,599
DATED : July 26, 1994
INVENTOR(S) : Norman G. Sanborn

It is certified that error appears in the above-indentified patent and that said Letters Patent is hereby corrected as shown below:

On the title page item [56], Brooks et al., U.S. Patent "4,853,117" should be --4,833,117--.

Column 1, line 68, after "cycle" insert a comma.

Signed and Sealed this

Fifth Day of March, 1996

Attest:

BRUCE LEHMAN

*Attesting Officer*  *Commissioner of Patents and Trademarks*